(12) United States Patent
Bogaerts (10) Patent No.: US 9,696,478 B2
(45) Date of Patent: Jul. 4, 2017

(54) INTEGRATED GRATING COUPLER AND POWER SPLITTER

(71) Applicants: IMEC VZW, Leuven (BE); Universiteit Gent, Ghent (BE)

(72) Inventor: Wim Bogaerts, Melle (BE)

(73) Assignees: IMEC VZW, Leuven (BE); Universiteit Gent, Ghent (BE)

( * ) Notice: Subject to any disclaimer, the term of this patent is extended or adjusted under 35 U.S.C. 154(b) by 0 days.

(21) Appl. No.: 14/808,085

(22) Filed: Jul. 24, 2015

(65) Prior Publication Data
US 2016/0025931 A1    Jan. 28, 2016

(30) Foreign Application Priority Data
Jul. 24, 2014  (EP) .................................... 14178372

(51) Int. Cl.
| | |
|---|---|
| G02B 6/34 | (2006.01) |
| F21V 8/00 | (2006.01) |
| G02B 6/293 | (2006.01) |
| G02B 6/30 | (2006.01) |
| G02B 6/124 | (2006.01) |
| G02B 6/122 | (2006.01) |

(52) U.S. Cl.
CPC ......... *G02B 6/0013* (2013.01); *G02B 6/0016* (2013.01); *G02B 6/29308* (2013.01); *G02B 6/29316* (2013.01); *G02B 6/124* (2013.01); *G02B 6/1228* (2013.01); *G02B 6/305* (2013.01)

(58) Field of Classification Search
CPC ...... G02B 6/34; G02B 6/0013; G02B 6/0016; G02B 6/29308; G02B 6/29316

USPC ......................................... 385/14, 15, 31, 37
See application file for complete search history.

(56) References Cited

U.S. PATENT DOCUMENTS

| | | | |
|---|---|---|---|
| 4,971,414 A | 11/1990 | Funato et al. | |
| 7,190,859 B2 * | 3/2007 | Greiner .................. | G02B 5/203 |
| | | | 359/10 |

(Continued)

OTHER PUBLICATIONS

"A polarization-diversity wavelength duplexer circuit in silicon-on-insulator photonic wires" by Bogaerts et al, Optics Express, vol. 15, No. 4, pp. 1567-1578, 2007.*

(Continued)

*Primary Examiner* — Robert Tavlykaev
(74) *Attorney, Agent, or Firm* — McDonnell Boehnen Hulbert & Berghoff LLP (57) ABSTRACT

An optical device is provided for coupling an external optical signal into a plurality of on-chip photonic sub-circuits provided on a substrate. The optical device comprises: a planar waveguide layer on the substrate; a diverging grating coupler configured to couple the external optical signal to the planar waveguide layer and to thereby create an on-chip diverging optical beam in the planar waveguide layer; and a plurality of channel waveguides formed in the waveguide layer. Each channel waveguide of the plurality of channel waveguides comprises a waveguide transition structure having a waveguide aperture oriented towards the diverging grating coupler. For each channel waveguide of the plurality of channel waveguides the position and the width of the corresponding waveguide aperture and the angle and the shape of the waveguide transition structure are individually selected to capture a predetermined portion of the on-chip diverging optical beam.

20 Claims, 7 Drawing Sheets

(56) References Cited

U.S. PATENT DOCUMENTS

| | | | | |
|---|---|---|---|---|
| 7,203,401 B2* | 4/2007 | Mossberg | ................ | G02B 5/32 372/102 |
| 2002/0044731 A1* | 4/2002 | Katayama | .......... | G02B 6/12011 385/24 |
| 2004/0076374 A1* | 4/2004 | Greiner | ................... | G02B 5/32 385/37 |
| 2004/0179779 A1* | 9/2004 | Greiner | .............. | G02B 6/12023 385/37 |
| 2004/0240787 A1* | 12/2004 | Yi | ..................... | G02B 6/12014 385/37 |
| 2007/0071388 A1* | 3/2007 | Lu | ..................... | G02B 6/12016 385/37 |
| 2012/0224805 A1* | 9/2012 | Doerr | .............. | B29D 11/00663 385/24 |
| 2012/0224810 A1 | 9/2012 | Doerr | | |

OTHER PUBLICATIONS

"Compact and highly efficient grating coupler between optical fiber and nanophotonic waveguides" by Van Laere et al, Journal of Lightwave Technology, vol. 25, No. 1, pp. 151-156, 2007.*
"Transient fields in the input coupling region of optical single-mode waveguides," by Klaus et al, Optics Express, vol. 15, No. 19, pp. 11808-11826, 2007.*
Christopher R. Doerr and Lawrence L. Buhl, Circular grating coupler for creating focused azimuthally and radially polarized beams, Optics Letters, Apr. 1, 2011, 1209-1211, vol. 36, No. 7.
Shogo Ura, Toshiaki Suhara, Hiroshi Nishihara, and Jiro Koyama, An Integrated-Optic Disk Pickup Device, Journal of Lightwave Technology, Jul. 1986, 913-918, vol. LT-4, No. 7.
Toshiaki Suhara and Hiroshi Nishihara, Integrated-optic disc pickup devices using waveguide holographic components, SPIE vol. 1136 Holographic Optics II: Principles and Applications, 1989, 92-99.

* cited by examiner

INTEGRATED GRATING COUPLER AND POWER SPLITTER

CROSS-REFERENCE TO RELATED APPLICATIONS

The present application is a non-provisional patent application claiming priority to European Patent Application No. 14178372.0 filed Jul. 24, 2014, the contents of which are hereby incorporated by reference.

FIELD OF THE DISCLOSURE

The present disclosure is related to a device and a method for coupling an external, off-chip optical beam to a plurality of on-chip photonic sub-circuits with good coupling efficiency.

BACKGROUND

Submicron silicon photonics waveguides offer the potential of large-scale integration. However, due to the lack of efficient on-chip light sources, there is a need for efficient methods and devices for coupling light from an off-chip optical light source to the silicon photonics circuit.

Given the cost of external laser integration, it may be advantageous to use a small number of such lasers, combined with an on-chip splitter tree distribution network to distribute the optical power generated by a single laser over a plurality of on-chip waveguides. Because in such a configuration each laser needs to feed many parts or photonic sub-circuits of the photonics circuit, the initial optical power coupled to the photonics circuit should be sufficiently high to compensate for a power reduction resulting from branching/splitting and on-chip losses.

In a silicon photonics circuit the amount of optical power that can be efficiently guided in a submicron wire waveguide is limited by nonlinear processes: two-photon absorption and subsequently free carrier absorption. These effects start occurring at an optical power as low as 10 mW in a 450 nm wide silicon strip waveguide. At an optical power of 50 mW the additional propagation loss due to nonlinear processes is about 3 dB/cm. This limits the maximum optical power that can be coupled to an on-chip submicron waveguide from an external light source, and therefore it limits the number of on-chip sub-circuits that can be powered from this single external light source.

SUMMARY

The present disclosure aims to provide devices and methods for coupling an external optical beam to a plurality of on-chip photonic sub-circuits with a good coupling efficiency.

The present disclosure aims to provide devices and methods for coupling an external optical beam to a plurality of on-chip photonic sub-circuits, wherein the optical power that can be coupled without substantial non-linear losses to the plurality of on-chip photonic sub-circuits is larger than in known approaches.

In a first aspect, the present disclosure provides an optical device for coupling an external optical beam or signal into a plurality of on-chip photonic sub-circuits on a substrate, the optical device comprising: a planar waveguide layer (e.g. slab waveguide) on the substrate; a diverging grating coupler configured to couple the external optical signal to the waveguide layer and to thereby create an on-chip diverging optical beam in the waveguide layer; and a plurality of channel waveguides formed in the waveguide layer, each channel waveguide of the plurality of channel waveguides comprising a waveguide transition structure having a waveguide aperture oriented towards the grating coupler, wherein for each channel waveguide of the plurality of channel waveguides the position and the width of the corresponding waveguide aperture and the angle and the shape of the corresponding waveguide transition structure are selected to capture a predetermined portion of the optical power of the on-chip diverging optical beam.

In embodiments of the present disclosure, each channel waveguide of the plurality of channel waveguides may be further optically coupled to at least one on-chip photonic sub-circuit, at a side opposite to the side where the waveguide transition structure is located.

In embodiments of the present disclosure the planar waveguide layer may be a silicon layer, for example a crystalline silicon layer, such as a silicon device layer of a silicon on insulator (SOI) wafer.

In embodiments of the present disclosure the grating coupler is configured to generate a diverging phase front in the planar waveguide layer. The grating coupler may for example be a curved grating coupler comprising a plurality of curved scattering elements. The grating coupler may for example comprise sub-wavelength patterns designed to create a diverging phase front in the planar waveguide layer. The dimensions of the patterns (sub-wavelength) may be adapted to the wavelength of the external optical signal to be coupled into the plurality of on-chip photonic sub-circuits.

In embodiments of the present disclosure, the diverging grating coupler may be formed in the planar waveguide layer. Alternatively, the diverging grating coupler may be formed on top of or underneath the planar waveguide layer.

In embodiments of the present disclosure the position and the width of the waveguide apertures and the angle and the shape of the waveguide transition structures may be selected to capture a substantially equal portion of the on-chip diverging optical beam in each of the channel waveguides.

In embodiments of the present disclosure the position and the width of the waveguide apertures and the angle and the shape of the waveguide transition structures may be selected to capture a predetermined, different, portion of the diverging optical beam power to each of the channel waveguides.

In embodiments of the present disclosure, for at least part of the plurality of channel waveguides, the waveguide transition structure may comprise a tapered waveguide section, such as for example a linearly tapered waveguide section, the present disclosure not being limited thereto.

In embodiments of the present disclosure, for at least part of the plurality of channel waveguides, the shape of the waveguide transition structure may be selected to enable adiabatic coupling of the captured portion of the on-chip diverging optical beam to the guided mode of the corresponding channel waveguide.

In embodiments of the present disclosure, for at least part of the plurality of channel waveguides, the shape of the waveguide transition structure may be selected to generate interference effects inside the transition structure to enable coupling of the captured portion of the on-chip diverging optical beam to the guided mode of the corresponding channel waveguide. These interference effects may for example be based on interference between multiple guided modes in the waveguide transition structure, deliberate internal reflections within the waveguide transition structure, or multiple intermediate channel waveguides in the transition structure.

In a second aspect, the present disclosure provides a method for coupling an external optical signal into a plurality of on-chip photonic sub-circuits on a substrate, wherein the method comprises: coupling the external optical signal to a planar waveguide layer on the substrate by means of a diverging grating coupler, thereby creating an on-chip diverging optical beam in the planar waveguide layer; and coupling the on-chip diverging optical beam from the planar waveguide layer into a plurality of channel waveguides formed in the waveguide layer. Each channel waveguide of the plurality of channel waveguides may be further optically coupled to at least one on-chip photonic sub-circuit.

In embodiments of the present disclosure, coupling the on-chip diverging optical beam from the planar waveguide layer into the plurality of channel waveguides comprises coupling into each of the plurality of channel waveguides a predetermined portion of the on-chip diverging optical beam.

In embodiments of the present disclosure, coupling into each of the plurality of channel waveguides a predetermined portion of the on-chip diverging optical beam comprises coupling the predetermined portion to a waveguide transition structure of the channel waveguide, wherein the waveguide transition structure has a waveguide aperture oriented towards the grating coupler, and wherein the position and the width of the waveguide aperture and the angle and the shape of the waveguide transition structure are selected to capture the predetermined portion.

Some embodiments of the present disclosure include the optical signal being distributed over a plurality of on-chip channel waveguides from a planar waveguide layer, without passing through a single channel waveguide. As compared to other coupling approaches, wherein the external optical signal is first coupled to a single on-chip channel waveguide and then distributed over a plurality of on-chip channel waveguides, a method according to embodiments of the present disclosure allows coupling an external optical signal with a higher optical power to the plurality of on-chip channel waveguides and further to a plurality of on-chip sub-circuits without optical losses or with lower optical losses. Therefore, a larger number of on-chip sub-circuits may be powered from a single external light source, e.g. an external laser.

Some embodiments of the present disclosure provide for tailoring the power splitting ratio between the plurality of channel waveguides and thus between the plurality of on-chip photonic sub-circuits in a single device. Some embodiments of the present disclosure provide for distributing the optical signal over a plurality of channel waveguides and thus over a plurality of on-chip photonic sub-circuits in a single device according to a predetermined optical power distribution ratio.

Certain aspects of the disclosure have been described herein above. Of course, it is to be understood that not necessarily all such aspects may be achieved in accordance with any particular embodiment of the disclosure. Thus, for example, those skilled in the art will recognize that the disclosure may be embodied or carried out in a manner that achieves or optimizes one aspect or group of aspects as taught herein without necessarily achieving other objects or aspects as may be taught or suggested herein. Further, it is understood that this summary is merely an example and is not intended to limit the scope of the disclosure. The disclosure, both as to organization and method of operation, together with features and advantages thereof, may best be understood by reference to the following detailed description when read in conjunction with the accompanying drawings.

Any reference signs in the claims shall not be construed as limiting the scope of the present disclosure.

In the different drawings, the same reference signs refer to the same or analogous elements.

DETAILED DESCRIPTION

In the following detailed description, numerous specific details are set forth in order to provide a thorough understanding of the disclosure and how it may be practiced in particular embodiments. However, it will be understood that the present disclosure may be practiced without these specific details. In other instances, well-known methods, procedures and techniques have not been described in detail, so as not to obscure the present disclosure.

The present disclosure will be described with respect to particular embodiments and with reference to certain drawings, but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Moreover, the terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising components A and B" should not be limited to devices consisting only of components A and B.

The present disclosure is related to an optical device for coupling an external optical signal into a plurality of on-chip photonic sub-circuits on a substrate. An optical device according to embodiments of the present disclosure comprises a diverging grating coupler configured to couple the external optical signal to the waveguide layer and to thereby create an on-chip diverging optical beam in the waveguide layer. The optical device further comprises a plurality of channel waveguides (further also referred to as "output waveguides") formed in the waveguide layer, each of the plurality of channel waveguides comprising a waveguide transition structure having a waveguide aperture oriented towards the grating coupler. For each of the plurality of channel waveguides the position and the width of the corresponding waveguide aperture and the angle and the shape of the corresponding waveguide transition structure are individually selected to capture a predetermined portion of the optical power of the on-chip diverging optical beam.

In embodiments of the present disclosure, the plurality of channel waveguides or output waveguides may each be optically coupled to at least one on-chip photonic sub-circuit, for example each to a single on-chip photonic sub-circuit.

Figure 1:
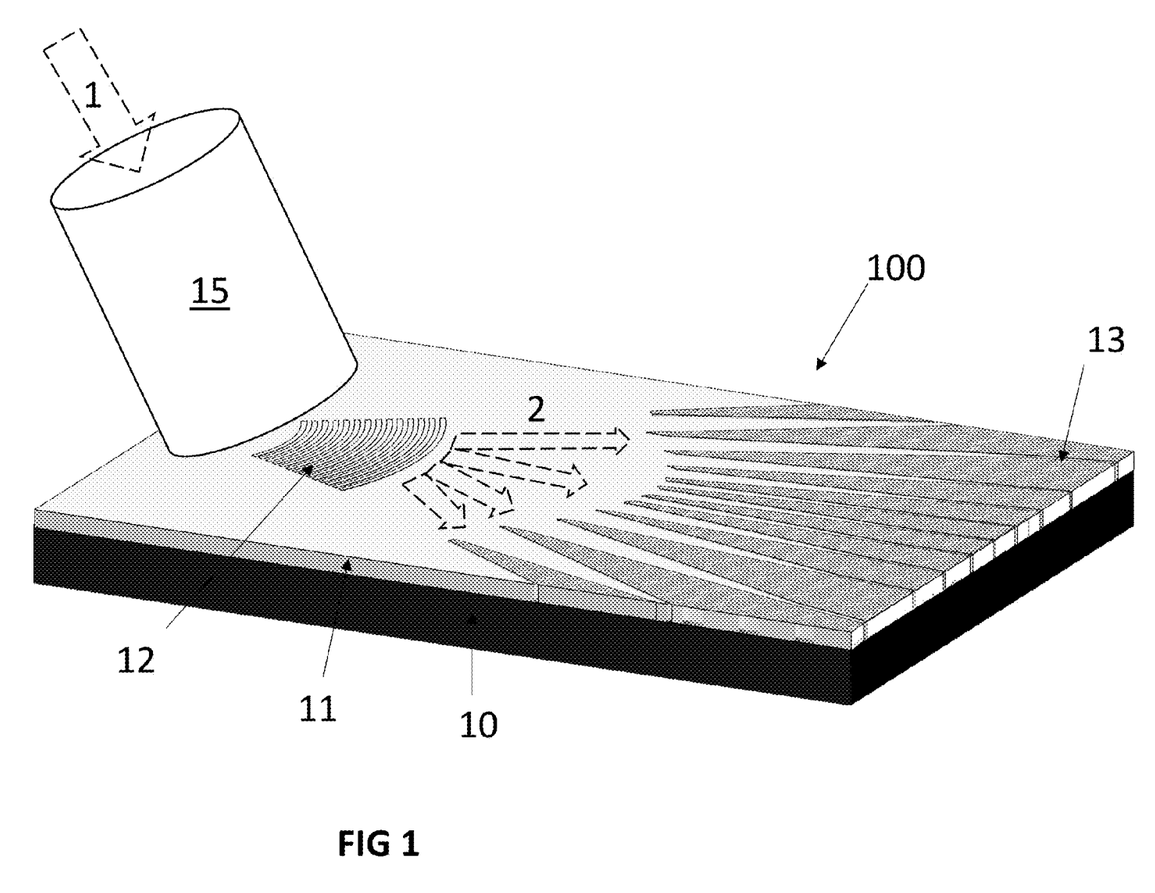
FIG. 1 schematically shows a perspective view of an optical device according to an embodiment of the present disclosure.
Figure 2:
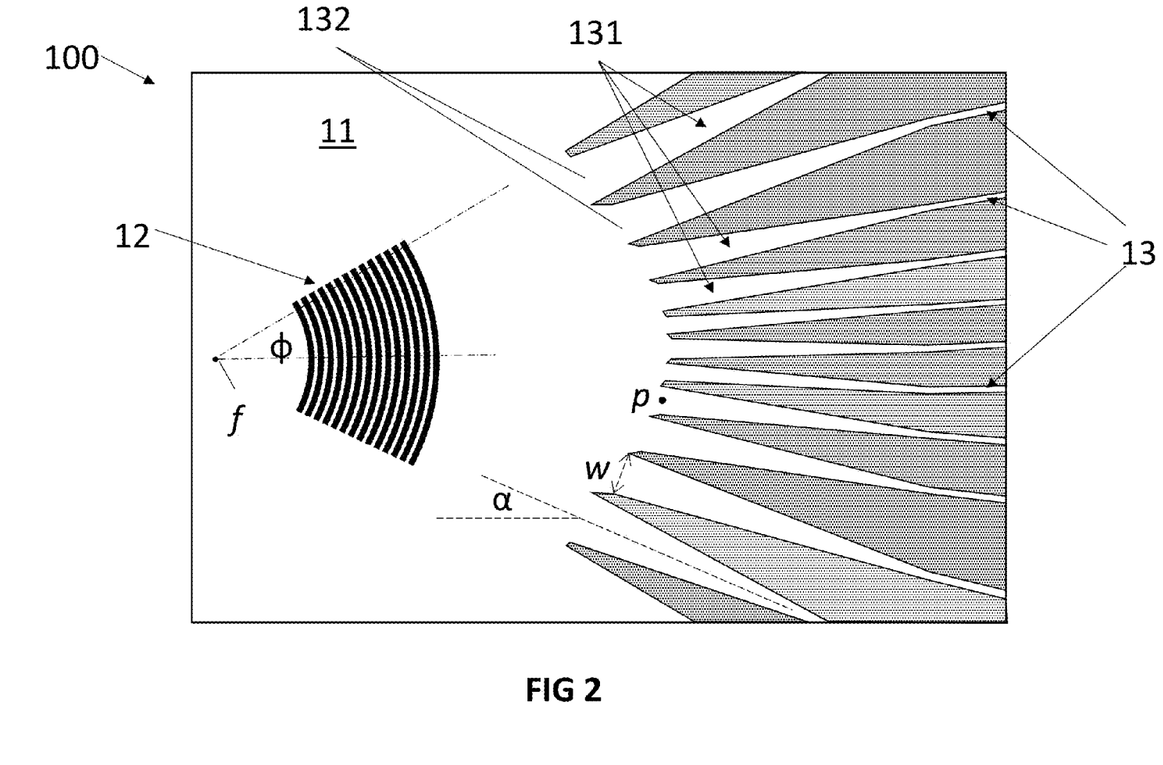
FIG. 2 schematically shows a top view of an optical device according to an embodiment of the present disclosure.

An optical device according to an embodiment of the present disclosure is schematically illustrated in FIG. 1 (perspective view) and in FIG. 2 (top view). In the example shown, the optical device 100 comprises a curved grating coupler 12 formed in a planar waveguide layer 11 on a substrate 10. The curved grating coupler 12 is an example of a diverging grating coupler. When an external light signal 1 is coupled by means of the diverging grating coupler 12 into the planar waveguide layer (or slab waveguide) 11, it is transformed into a diverging optical beam 2 (diverging phase front of light) in the planar waveguide layer 11. This is schematically illustrated in FIG. 1: an external optical signal 1, e.g. generated by an external laser, and provided through an optical fiber 15, is coupled by means of the curved grating coupler 12 to the planar waveguide layer 11, thereby creating a diverging on-chip optical power beam 2 in the planar waveguide layer 11.

The diverging grating coupler 12 may for example be a curved grating coupler, e.g. comprising a plurality of elliptically curved confocal grating lines. However, the present disclosure is not limited thereto and the curved lines of the grating may deviate from an ellipse shape. Other suitable diverging couplers may be used. For example, in embodiments of the present disclosure the diverging grating coupler may comprise other patterns and elements constructed to generate a diverging phase front, such as a plurality of sub-wavelength holes.

The grating pattern can be fabricated in the waveguide layer, e.g. by locally etching (fully or partially) the waveguide layer according to the desired grating pattern. The grating pattern can also be created in one or multiple layers of material above or under the waveguide layer, the one or multiple layers for example consisting of or comprising a dielectric material, a semiconductor material or a metal.

Additional layers may be provided. For example, the coupling efficiency of the grating coupler 12 may be improved by providing an overlay, e.g. poly-silicon overlay, over the grating.

The optical device 100 further comprises a plurality of channel waveguides 13 formed in the waveguide layer 11. Each of the plurality of channel waveguides 13 comprises a waveguide transition structure 131 (shown as a linearly tapered section in FIG. 1 and FIG. 2) having a waveguide aperture 132 or opening oriented towards the diverging grating coupler 12, for capturing a portion of the power of the on-chip diverging optical beam 2. For each of the plurality of channel waveguides 13 the position p, and the width w of the corresponding waveguide aperture 132 and the angle $\alpha$ and the shape of the corresponding waveguide transition structure 131 are individually selected to capture a predetermined portion of the power of the diverging on-chip optical beam 2.

The angle $\alpha$ of a transition structure 131 and the position p and the width w of a waveguide aperture 132 are shown in FIG. 2. The width w corresponds to the size of the waveguide aperture 132, i.e. the distance between one side and the opposite side of the opening through which light may pass into the transition structure 131 towards the channel waveguides 13. The position p corresponds to the location of a center point (middle point between the opposite sides) of the waveguide aperture 132 in the plane of the waveguide layer 11.

The channel waveguides 13 and the waveguide transition structures 131, e.g. tapered sections, may be formed by etching trenches in the planar waveguide layer 11. In an embodiment illustrated in FIG. 1 and FIG. 2 these transition structures 131 taper linearly to a single-mode waveguide, for adiabatically transferring a significant fraction of the captured power to the guided mode of the output waveguide 13 (adiabatic coupling). However, the present disclosure is not limited thereto and other transition structure shapes may be used, for example shapes inducing interference effects based on multiple guided modes in the waveguide transition structure, intentional internal reflections within the transition structure, or multiple intermediate channel waveguides.

An optical device according to embodiments of the present disclosure may for example be fabricated using an SOI wafer. The silicon planar waveguide layer 11 shown in FIG. 1 and FIG. 2 then corresponds to the silicon device layer of the SOI wafer.

In the example shown in FIG. 1, the external optical signal 1 is provided through an optical fiber 15. The optical fiber 15 may for example be positioned at a near-vertical angle, e.g. along a line in a symmetry plane of the grating coupler, the present disclosure not being limited thereto. For example, the optical fiber 15 may be mounted at an angle in the range between 0 and 30 degrees, e.g. between 0 and 10 degrees with respect to an orthogonal to the waveguide layer 11.

In other embodiments of the present disclosure the external optical signal 1 may be provided directly from a light source, e.g. from a laser, provided on the grating coupler 12.

In a device according to embodiments of the present disclosure, the waveguide apertures 132 are designed to capture a predetermined portion of the optical power of the on-chip diverging optical beam 2. The efficiency of light capturing is proportional to the power of the light and depends on the optical field overlap between the local field profile of the diverging optical beam and the field profile in the aperture excited by the ground mode of the corresponding channel waveguide.

The phase fronts diverge from the focal point f (indicated in FIG. 2) of the grating coupler 12. The intensity profile (optical power distribution) of the diverging beam 2 in the planar waveguide layer 11 may be assumed to be Gaussian-like, similar to the intensity profile of the fiber mode. A uniform configuration of the plurality of channel waveguides (i.e. a configuration with identical radii, i.e. identical distances from the focal point of the diverging phase front, and with identical aperture widths w for all waveguide apertures) may then result in a similar Gaussian distribution over the different channel waveguides or output waveguides.

In embodiments of the present disclosure the distribution of optical power between the plurality of apertures 132 may be individually tailored. The amount of optical power coupled to the different channel waveguides 13 may be different for different waveguides, e.g. it may be different for each waveguide. In an example embodiment that relates to a power distribution network, a homogeneous power distribution may be used. In such a scenario, the apertures 132 may be designed to each capture substantially the same optical power.

To balance the distribution of the optical power between the plurality of waveguide apertures 132, the efficiency of light capturing may be substantially the same for all apertures. In a first approximation, this may be accomplished by adjusting the angular coverage of each waveguide aperture 132 in such a way that each of the plurality of apertures captures substantially the same fraction of optical power of the diverging beam. This may for example be done by adapting the width w of the waveguide aperture 132: a wider waveguide aperture 132 will capture more light. This may for example also be done by changing the position p of the waveguide aperture 132 with respect to the grating coupler 12: a waveguide aperture 132 closer to the grating coupler 12 will capture more light.

Figure 3:
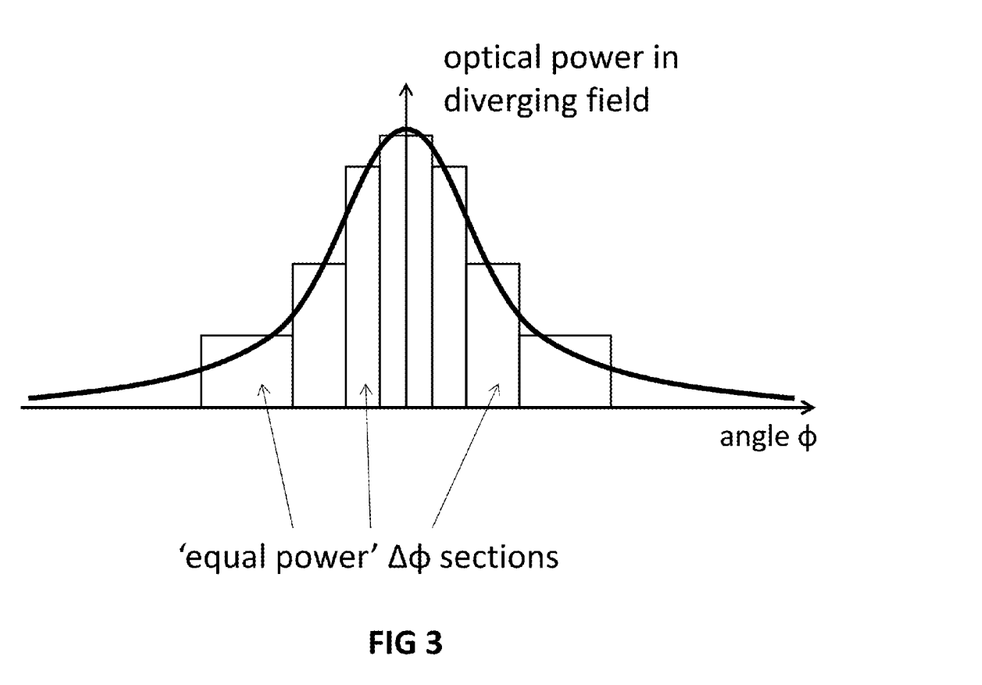
FIG. 3 illustrates the angular spread of the optical power in the on-chip diverging optical beam, and splitting of the diverging optical beam into angular sections with equal power.

To homogenize the optical power distribution over the different channel waveguides 13, the radially diverging phase front 2 may be split into angular sections Δφ with equal power along the in-plane angle φ (shown in FIG. 2). This is schematically illustrated in FIG. 3. The different angular coverages can then be realized by properly selecting the width w and position p of each of the individual waveguide apertures 132.

Different schemes were designed for the waveguide apertures 132, including a configuration with a fixed radius, wherein all waveguide apertures 132 were provided at the same distance from the grating focal point f, and a configuration with a fixed width wherein all waveguide apertures 132 had the same opening width w. It was found that the best results were achieved with a more balanced approach, such as providing the apertures in a Rowland circle (FIG. 4) with its pole in the focal point of the diverging beam, and then modifying the widths of the apertures 132 accordingly.

As an example, optical devices 100 in accordance with embodiments of the present disclosure were fabricated, the devices containing 16 channel waveguides 13. The devices were fabricated on 200 mm SOI wafers with a buried oxide layer thickness of 2 micrometer and a crystalline silicon device layer 11 thickness of 220 nm. The devices were patterned in multiple steps: first the waveguide transition structures 131 were defined using a partial etching into the silicon device layer, and next the waveguides 13 were defined in a subsequent etching through the waveguide layer (silicon device layer 11). The gratings 12 were either defined by the same partial etching step as used for the transition structures 131 or formed in a poly-silicon overlay processed afterwards.

Figure 4:
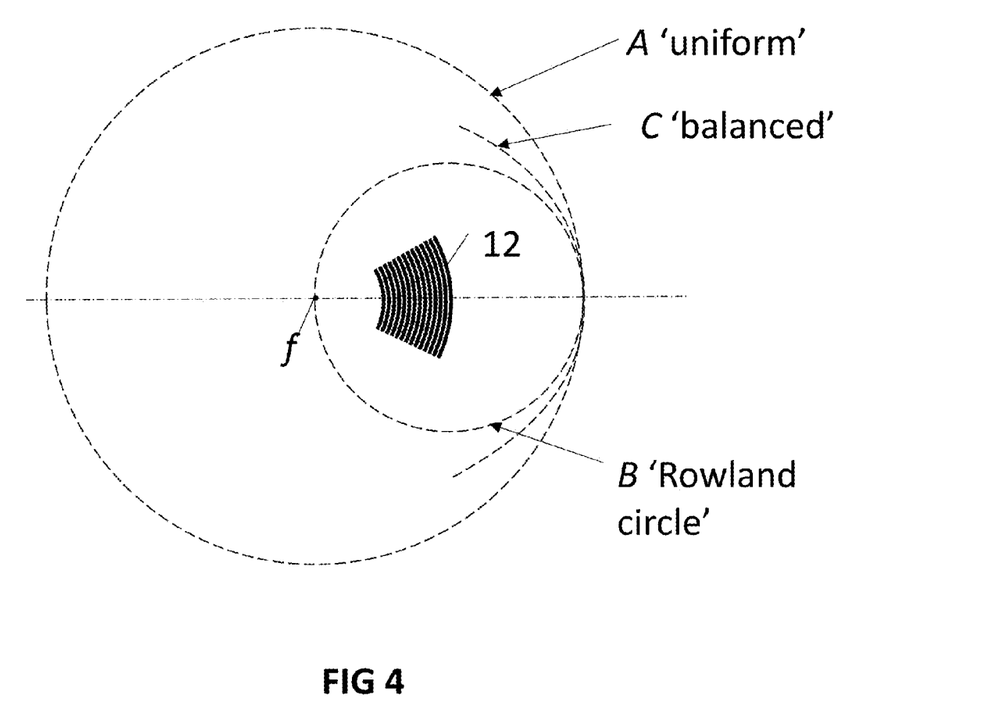
FIG. 4 schematically illustrates three different configurations for the position of the waveguide apertures, as may be used in embodiments of the present disclosure: 'uniform', 'balanced' and 'Rowland circle'.

Three different configurations were realized, as schematically illustrated in FIG. 4. The first configuration, also referred to as a 'uniform' configuration, is a configuration wherein the positions p of the waveguide apertures 132 are located on a circle (shown as dashed circle A in FIG. 4) centered around the focal point f of the grating coupler 12, and wherein all waveguide apertures 132 have the same width w. This configuration has no optimization and/or adjustment for power balancing and serves here as a reference. The second configuration or 'Rowland' configuration is a configuration wherein the positions p of the waveguide apertures 132 are placed on a Rowland circle (shown as dashed circle B in FIG. 4), i.e. a circle which passes through the focal point of the diverging beam (as opposed to circle A where the center is in the focal point), and wherein for the individual waveguide apertures 132 the width w and the location on the circle are modified to balance the power collection of the diverging wave. The third configuration is a 'balanced' configuration (shown as a dashed part of a circle C in FIG. 4) wherein the position p of the waveguide apertures 132 is in between that of the Rowland configuration and that of the uniform configuration, and wherein the individual widths w of the waveguide apertures 132 are optimized and/or adjusted for equal power collection.

Figure 5:
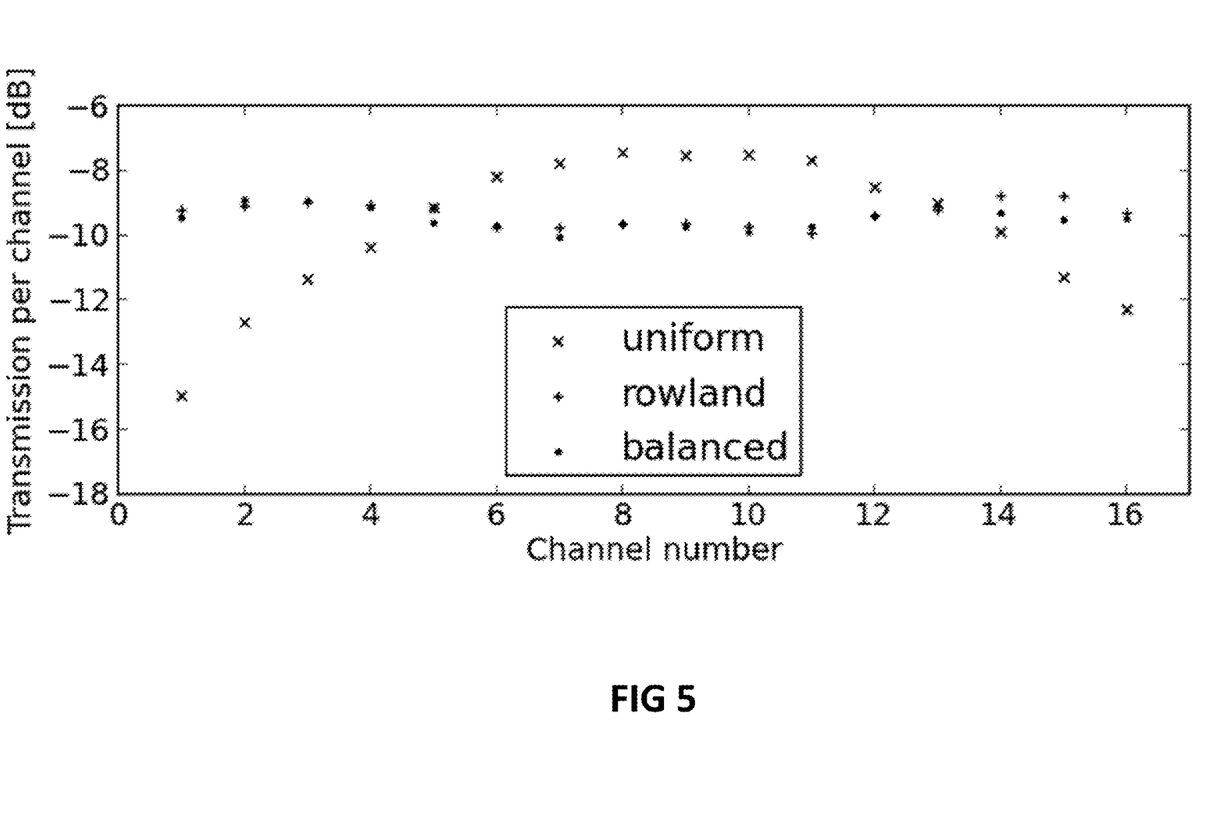
FIG. 5 shows the measured transmission to 16 on-chip channel waveguides in a device according to an embodiment of the present disclosure, for different configurations of the position of the waveguide apertures.

Measurements were done to determine the coupling efficiency of an optical signal 1 to the 16 on-chip channel waveguides 13. FIG. 5 shows the normalized transmission for each of the 16 channels as measured for the three different configurations schematically illustrated in FIG. 4. From the results shown in FIG. 5 it is clear that for a uniform configuration a Gaussian distribution is obtained over the output channels (channel waveguides 13), corresponding closely to the power profile of the diverging wave 2. In case of a balanced or a Rowland configuration a more equal power distribution is obtained over the different channels. The balanced configuration yields a maximum power imbalance of only 1.11 dB. Furthermore, it was found that the total coupling efficiency (power in all channels combined), at −3.23 dB, is 2.48 dB higher than that of a focusing grating coupler coupling to a single waveguide implemented in the same technology. This is possible because the power is collected over a larger area in case of the diverging grating coupler, making it more tolerant to imperfections in e.g. the grating pattern. A slightly higher total efficiency but with a somewhat larger imbalance was found for the Rowland configuration.

Figure 6:
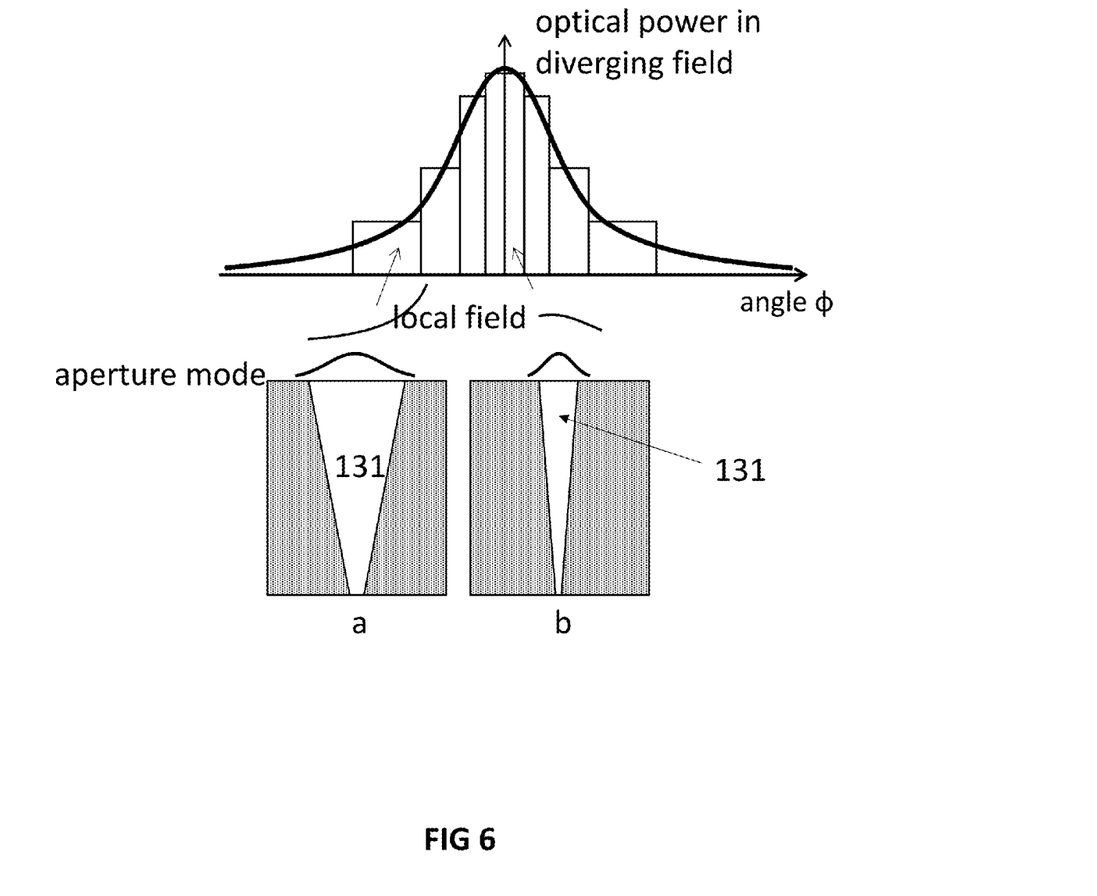
FIG. 6 illustrates an approach that may be used in embodiments of the present disclosure to compensate for the uneven angular power distribution of the on-chip diverging optical beam as well as a bad overlap between the local field of the diverging optical beam and the mode of a waveguide, making use of adiabatic conversion between the captured field and the channel waveguide mode.

The uniformity and overall coupling efficiency may be further improved. Because discrete apertures are used, the field overlap between the aperture mode and the diverging beam may not be perfect, resulting in a loss factor for each aperture. This loss factor is larger for a wider aperture: an aperture has a Gaussian-like mode, which may have a poor overlap with the local plane wave. The loss factor is also larger off-axis from the symmetry plane of the grating coupler, because the intensity profile has a large asymmetry and the aperture has a symmetric field profile. The result of both these effects is that the outer apertures exhibit a lower coupling efficiency. This may be compensated by making the outer apertures wider such that they have a larger angular coverage. This approach is schematically illustrated in FIG. 6. Changing the angular coverage of one aperture affects all the other apertures, so this approach does require intensive optimization and/or adjustment.

Figure 7:
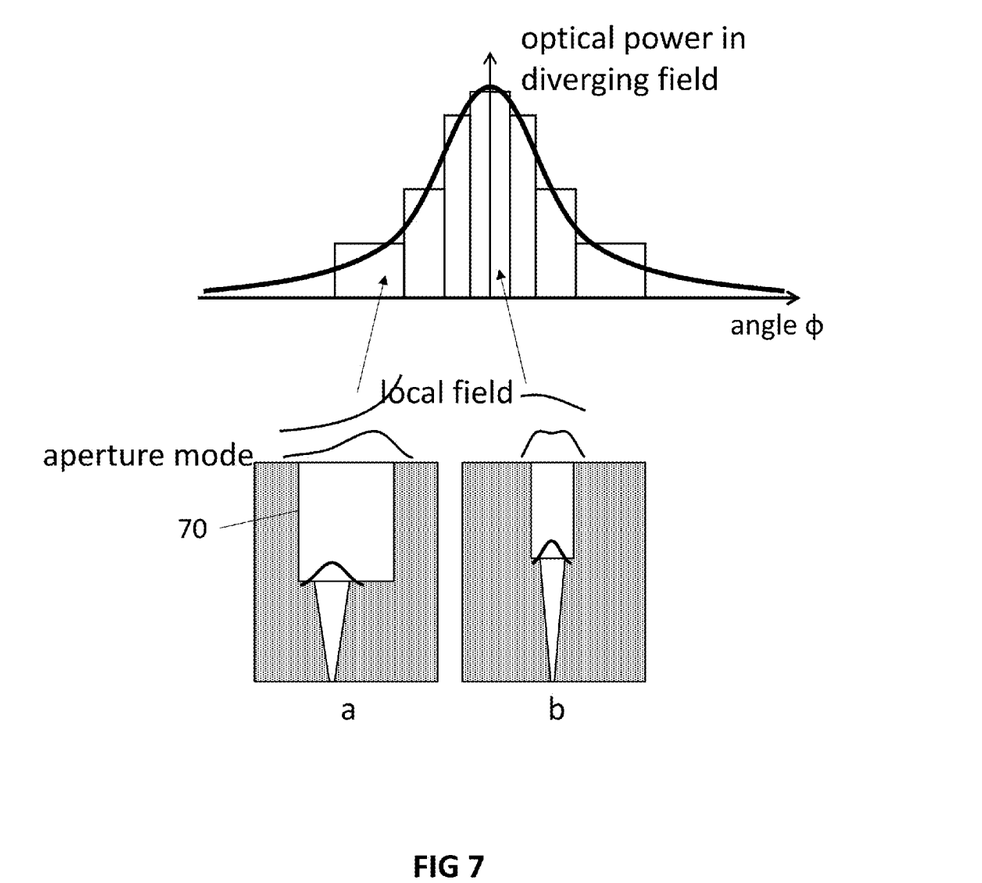
FIG. 7 illustrates an approach that may be used in embodiments of the present disclosure to compensate for a bad overlap between the local field of the diverging optical beam and the guided mode of the channel waveguide, making use of interference between multiple guided modes in the waveguide transition structure.

The approach illustrated in FIG. 6 may be used to address any remaining unbalance between apertures. However, it does not address losses in efficiency due to imperfect modal overlap. These losses may be compensated in part by tailoring the field profile in the aperture 132 excited by the output waveguide mode. A better overlap may be obtained if the field profile is tailored such that it resembles as much as possible the local profile of the diverging wave. This can be done by changing the geometry or shape of the transition structures 131 and making use of interference effects. A particular implementation is the inclusion of a rectangular section 70 (a multi-mode interferometer) in the transition structure 131, as illustrated in FIG. 7. This approach can be used for the center channels, where the incident field also has a local flat profile. For the outer channels, the technique can be used to create a slanted profile matching that of the local incident wave.

Alternatively, or in combination with this technique it is possible to use interference effects based on internal reflection in the transition structure (e.g. induced by abrupt changes in transition structure width or inclusion of optical scattering elements inside the transition structures), or interference effects based on multiple intermediate channel waveguides.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

While the above detailed description has shown, described, and pointed out certain features of the systems and devices as applied to various embodiments, it will be understood that various omissions, substitutions, and changes in the form and details of the device or process illustrated may be made by those skilled in the technology without departing from the scope of the disclosure.

What is claimed is:

1. An optical device for coupling an external optical signal into a plurality of on-chip channel photonic sub-circuits provided on a substrate, wherein the optical device comprises:
   a planar waveguide layer on the substrate;
   a diverging grating coupler configured to couple the external optical signal to the planar waveguide layer, thereby creating a single on-chip diverging optical beam in the planar waveguide layer,
   wherein the diverging grating coupler is a curved grating coupler; and
   a plurality of channel waveguides formed in the planar waveguide layer, each channel waveguide of the plurality of channel waveguides comprising a waveguide transition structure having a waveguide aperture oriented towards the diverging grating coupler,
   wherein for each channel waveguide of the plurality of channel waveguides a position and a width of the waveguide aperture and an angle and a shape of the waveguide transition structure are selected to capture a predetermined portion of the single on-chip diverging optical beam,
   wherein the waveguide transition structure of a center channel waveguide comprises a center rectangular section,
   wherein the waveguide transition structure of an outer channel waveguide comprises an outer rectangular section,
   wherein the center rectangular section and the outer rectangular sections are configured to match an incident field profile of the corresponding predetermined portion of the single on-chip diverging optical beam, and
   wherein the predetermined portion of the single on-chip diverging optical beam is captured from a slab waveguide region defined in the planar waveguide layer between the diverging grating coupler and the waveguide aperture.

2. The optical device according to claim 1, wherein the incident field profile at the center channel waveguide is a flat profile, and wherein the incident field profile at the outer channel waveguide is a slanted profile.

3. The optical device according to claim 1, wherein the planar waveguide layer is a silicon layer, and wherein the planar waveguide layer is a device layer of a silicon on insulator (SOI) wafer.

4. The optical device according to claim 1, wherein the diverging grating coupler comprises sub-wavelength patterns.

5. The optical device according to claim 1, wherein for at least part of the plurality of channel waveguides the corresponding waveguide transition structure comprises a tapered section.

6. The optical device according to claim 1, wherein for at least a first channel waveguide and a second channel waveguide of the plurality of channel waveguides, the respective positions and the respective widths of the respective waveguide apertures and the respective angles and the respective shapes of the respective waveguide transition structures are selected to capture different portions of the single on-chip diverging optical beam in the first channel waveguide and the second channel waveguide according to a predetermined optical power distribution ratio.

7. The optical device according to claim 1, wherein for at least part of the plurality of channel waveguides the shape of the waveguide transition structure is selected to enable adiabatic coupling of the captured portion of the single on-chip diverging optical beam to a guided mode of the corresponding channel waveguide.

8. The optical device according to claim 1, wherein for at least part of the plurality of channel waveguides the shape of the waveguide transition structure is selected to generate interference effects inside the waveguide transition structure to enable coupling of the captured predetermined portion of the single on-chip diverging optical beam to a guided mode of the corresponding channel waveguide.

9. The optical device according to claim 1, wherein the diverging grating coupler comprises a focal point, wherein each waveguide aperture is arranged along a circle centered around the focal point.

10. The optical device according to claim 9, wherein the single on-chip diverging optical beam diverges in the area in the planar waveguide layer between the waveguide aperture and the diverging grating coupler, wherein the single on-chip diverging optical beam diverges based on the focal point of the diverging grating coupler.

11. The optical device according to claim 1, wherein the diverging grating coupler comprises a focal point, wherein each waveguide aperture is arranged along a circle that passes through the focal point.

12. The optical device according to claim 1, wherein the diverging grating coupler comprises a focal point, wherein each waveguide aperture is arranged between a circle centered around the focal point and a circle that passes through the focal point.

13. The optical device according to claim 1, wherein the diverging grating coupler is further configured to couple the external optical signal from an angle between 0 and 30 degrees with respect to a plane that is orthogonal to the planar waveguide layer.

14. The optical device according to claim 1, wherein the waveguide aperture of the outer channel waveguide is wider than the waveguide aperture of the center channel waveguide.

15. The optical device according to claim 1, wherein the plurality of channel waveguides comprises a first channel waveguide and a second channel waveguide, wherein at least one of: a position of a first channel waveguide aperture, a width of the first channel waveguide aperture, an angle of the first waveguide transition structure, or a shape of the first waveguide transition structure is different from a corresponding structure of the second channel waveguide.

16. A method for coupling an external optical signal into a plurality of on-chip photonic sub-circuits on a substrate, the method comprising:
coupling the external optical signal to a planar waveguide layer on the substrate by a diverging grating coupler, thereby creating a single on-chip diverging optical beam in the planar waveguide layer,
wherein the diverging grating coupler is a curved grating coupler; and
coupling the single on-chip diverging optical beam from a slab waveguide region defined in the planar waveguide layer into a plurality of channel waveguides formed in the planar waveguide layer, each channel waveguide of the plurality of channel waveguides comprising a waveguide transition structure having a waveguide aperture oriented towards the diverging grating coupler,
wherein the slab waveguide region is between the plurality of channel waveguides and the diverging grating coupler,
wherein the diverging grating coupler comprises a focal point, and
wherein each waveguide aperture is arranged between a circle centered around the focal point and a circle that passes through the focal point.

17. The method according to claim 16, wherein coupling the single on-chip diverging optical beam from the planar waveguide layer into the plurality of channel waveguides comprises coupling into each channel waveguide of the plurality of channel waveguides a predetermined portion of the single on-chip diverging optical beam.

18. The method according to claim 17, wherein coupling into each channel waveguide of the plurality of channel waveguides a predetermined portion of the single on-chip diverging optical beam comprises coupling the predetermined portion to the waveguide transition structure through the waveguide aperture of the channel waveguide, wherein a position and a width of the waveguide aperture and an angle and a shape of the waveguide transition structure are selected to capture the predetermined portion.

19. The method according to claim 16, wherein the plurality of channel waveguides comprises a first channel waveguide and a second channel waveguide, wherein at least one of: a position of a first channel waveguide aperture, a width of the first channel waveguide aperture, an angle of the first waveguide transition structure, or a shape of the first waveguide transition structure is different from a corresponding structure of the second channel waveguide.

20. A system, comprising:
an optical device for coupling an external optical signal into a plurality of on-chip channel photonic sub-circuits provided on a substrate, wherein the optical device comprises:
a planar waveguide layer on the substrate;
a diverging grating coupler configured to couple the external optical signal to the planar waveguide layer, thereby creating a single on-chip diverging optical beam in the planar waveguide layer,
wherein the diverging grating coupler is a curved grating coupler; and
a plurality of channel waveguides formed in the planar waveguide layer, each channel waveguide of the plurality of channel waveguides comprising a waveguide transition structure having a waveguide aperture oriented towards the diverging grating coupler,
wherein for each channel waveguide of the plurality of channel waveguides a position and a width of the waveguide aperture and an angle and a shape of the waveguide transition structure are selected to capture a predetermined portion of the single on-chip diverging optical beam,
wherein the waveguide transition structure of a center channel waveguide comprises a center rectangular section,
wherein the waveguide transition structure of an outer channel waveguide comprises an outer rectangular section,
wherein the center rectangular section and the outer rectangular sections are configured to match an incident field profile of the corresponding predetermined portion of the single on-chip diverging optical beam, and
wherein the predetermined portion of the single on-chip diverging optical beam is captured from a slab waveguide region defined in the planar waveguide layer between the diverging grating coupler and the waveguide aperture; and
a light source configured to provide the external optical signal directly to the grating coupler, wherein the light source comprises a laser.

* * * * *